Feb. 9, 1937.  A. KATONA  2,070,231
ACID CONTAINER
Filed Feb. 19, 1935
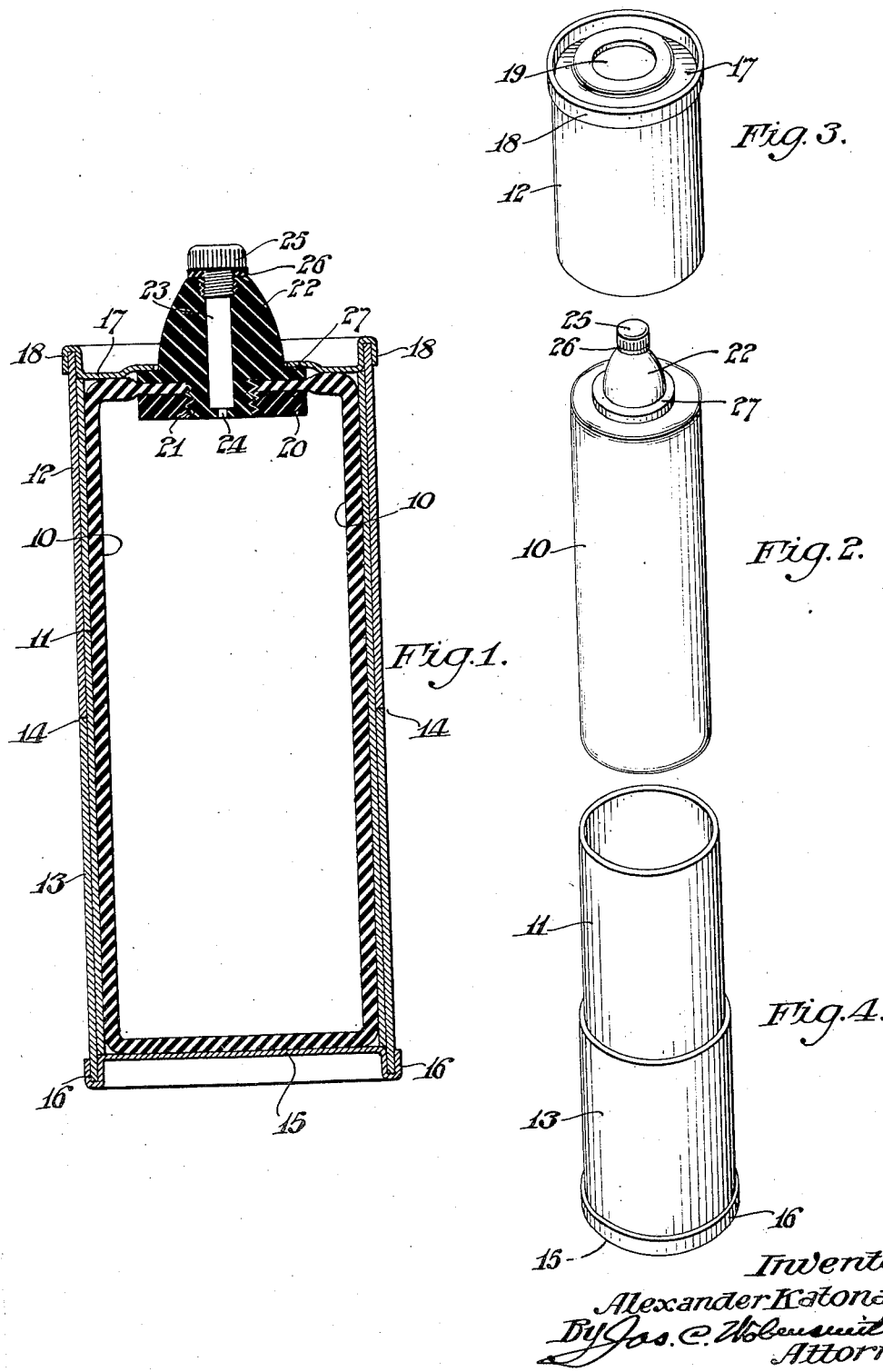
Inventor:
Alexander Katona,
By Jos. C. Holcombsmith
Attorney Patented Feb. 9, 1937

2,070,231

UNITED STATES PATENT OFFICE 2,070,231

ACID CONTAINER

Alexander Katona, Philadelphia, Pa., assignor, by mesne assignments, to Meeka Laboratories, Inc., Philadelphia, Pa., a corporation of Pennsylvania Application February 19, 1935, Serial No. 7,198

8 Claims. (Cl. 206—2)

This invention relates to acid containers, that is to say, to receptacles which are adapted to contain corrosive liquids such as acids and the like, whereby the same may be dispensed from time to time as required.

Numerous attempts have been made to provide a satisfactory container for hydrofluoric acid and the like, whereby the same may be conveniently used in laundries and other establishments for the elimination of rust spots and other discolorations which respond to treatment by such materials.

Recourse has been had to the use of hard rubber receptacles, which, however, are dangerous in that no matter how carefully they are protected by surrounding casings, the hard rubber shells are quite likely to be fractured and thus permit the escape of the contents. Wax and paraffin shells have also been employed, but these are even more objectionable for the same reason, and also because of the difficulty of mounting the nozzles or other fittings. Containers of sheet metal with thin rubber linings have also been used, which necessitated the cementing of the lining to the walls of the container, and also involved complications in the attachment of the fittings.

The principal object of the present invention is to provide a contaner for highly corrosive liquids such as hydrofluoric acid, which will be simple and inexpensive, yet efficient for its intended purpose.

A further object of the invention is to provide a container of the character aforesaid which will be so constructed and arranged that it may be quickly and conveniently filled, but which may have a dispensing nozzle or fitting readily attached thereto.

A further object of the invention is to provide a container of the character aforesaid which will be both leak and fracture proof.

A further object of the invention is to provide a container of the character aforesaid which may be safely used even by those who do not fully appreciate the dangerous character of the material contained therein.

The nature and characteristic features of the invention will be more readily understood from the following description, taken in connection with the accompanying drawing forming part hereof, in which:

Figure 1 is a vertical central sectional view of an acid container embodying the main features of the present invention;

Fig. 2 is a perspective view of the internal portion of the container, certain parts connected thereto also being shown;

Fig. 3 is a perspective view of a part of a protective casing constituting a portion of the structure; and Fig. 4 is a similar view of other parts thereof.

It will, of course, be understood that the description and drawing herein contained are illustrative merely, and that various modifications and changes may be made in the structure disclosed without departing from the spirit of the invention.

Referring to the drawing, in the particular embodiment of the invention therein shown, the container proper comprises a hollow shell 10 of soft rubber, having a sufficient wall thickness to be self-sustaining and to maintain its shape under normal conditions. The shell 10 may be cylindrical, or it may be rectangular, or any other desired shape, in horizontal plan.

The internal rubber shell 10 is mounted in an open ended tube 11, preferably made of cardboard or the like, the internal dimensions of which are substantially equal to, or preferably slightly less than, those of the internal shell 10.

Surrounding the tube 11 are upper and lower tubular members 12 and 13, respectively, also preferably made of cardboard or the like, which telescope over the tube 11 and meet intermediate the ends of said tube, as at 14, when the structure is assembled.

The lower outer tube 13 is provided with an end closure member 15, preferably made of sheet metal or the like, having its edge portions formed to engage and grip the lower end of said tube 13, as at 16. The upper outer tube 12 is also provided with a similar end closure member 17, also preferably made of sheet metal or the like, and having its edge portions formed to engage and grip the upper end of said tube 12, as at 18. The upper end closure member 17 is provided with a central aperture 19, through which extends a nozzle which will be hereinafter described.

A disk 20 of hard rubber or the like is secured to the inner face of the upper horizontal wall of the internal soft rubber shell 10. This disk 20 has a central aperture 21, provided with screw threads for the mounting on the shell 10 of a hard rubber nozzle member 22, the under face of which is adapted to compress a portion of the upper horizontal wall of the shell 10 against the disk 20 when said nozzle is screwed in place in said disk, thereby insuring a seal at the place of connection of the nozzle member 22 to the inner shell 10. If desired, rubber cement may be used between the under face of the nozzle member 22 and the upper face of the horizontal wall of the shell 10, which will serve to prevent the nozzle member from being improperly detached from the shell.

The nozzle member 22 may be provided with a central passageway 23 for the dispensing of the liquid therethrough, preferably having at one place a constricted portion 24 which will prevent the material from escaping too rapidly through the outlet. The discharge port 23 may be closed by means of a suitably threaded plug 25 and washer 26.

The nozzle member 22 is preferably provided with a flange 27, which is adapted to be seated or confined between the upper horizontal wall of the soft rubber shell 10, and the portion of the end closure member 17 which surrounds the central aperture 19 thereof.

The material may be placed within the soft rubber shell 10, which has the hard rubber disk 20 secured on the inner face of the top horizontal wall thereof, before the nozzle member 22 is mounted on said shell by being threaded in the hard rubber disk 20. After the material is placed in the shell 10, the nozzle member 22 may then be inserted and screwed tightly to position, preferably being cemented in place by means of rubber cement.

The filled shell 10, with the nozzle member 22 in place as aforesaid, is then inserted in the inner cardboard tube 11, which, if desired, may have previously been inserted in the lower outer cardboard tube 13, and secured thereto by glue or other suitable adhesive. The upper outer tube 12 may now be placed over the inner cardboard tube 11, and also secured thereto by glue or other suitable adhesive, this tube 12 being pushed to a position where the lower edge thereof abuts against the upper edge of the lower outer tube 13, whereupon the sheet metal end members 15 and 17 will contact with and securely hold the horizontal walls of the inner shell 10.

When the upper outer tube 12 is pushed to position, the central aperture 19 of the end member 17 thereof will pass downwardly over the nozzle member 22, making a snug fit therewith in the final position, the flange 27 of the nozzle member 22 being gripped by that portion of the upper end closure member 17 which surrounds the aperture 19 through which said nozzle member extends.

When it is desired to use the material, it is merely necessary to remove the closure plug 25 and invert the container, whereupon a sufficient quantity of the liquid will pass through the constricted passageway 24, thence through the main passageway, to the outer surface of the end portion of the nozzle member 22, by means of which it may be applied to the goods to be treated.

A container constructed as aforesaid will be safe under conditions usually met in the use of such materials as hydrofluoric acid and the like, in that there will be no likelihood of fracture of the same by shock or blows on the outer casing.

It will be seen that the soft rubber shell 10 will readily accommodate itself to any deformation of the casing, and the walls of the shell being of sufficient thickness to be self-sustaining, the shell will at all times retain its normal shape within the casing. Furthermore, as the shell is securely gripped within the casing, there will be no likelihood of its rotating within the same when the plug 25 is removed for the purpose of dispensing a quantity of the contents.

I claim:

1. A combined shipping and dispensing container comprising a relatively rigid outer casing having end closure members, an inner fluid container within said casing and provided with a projecting dispensing member, one of said end closure members having an opening therethrough through which the dispensing member extends, said inner container being in contact with said outer casing and with said other end closure member and being composed of soft yieldable rubber self sustaining as to shape and form independent of said outer container.

2. A combined shipping and dispensing container comprising a relatively rigid outer casing having end closure members, an inner fluid container within and substantially filling said casing and provided with a projecting dispensing member, one of said end closure members having an opening therethrough through which the dispensing member extends, said inner container being composed of soft yieldable rubber self sustaining as to shape and form independent of said outer container.

3. A combined shipping and dispensing container comprising an outer casing having a tubular wall of cardboard and end closure members of sheet metal, an inner fluid container within said casing and provided with a dispensing nozzle, one of said end closure members having an opening therethrough through which the dispensing nozzle extends, said inner container being in contact with said outer casing and with said other end closure member and being composed of soft yieldable rubber and self sustaining as to shape and form independent of said outer container.

4. A combined shipping and dispensing container for corrosive liquids comprising an outer casing having a relatively rigid tubular wall, and end closure members of a material yieldable under shocks, a fluid container within and substantially filling said casing, a dispensing nozzle attached to said container, one of said end closure members having an opening therethrough through which the dispensing nozzle extends, said inner container being composed of a soft yieldable corrosive resistant material self sustaining as to shape and form independent of said outer container.

5. A combined shipping and dispensing container comprising an outer relatively rigid casing member, an inner fluid container and a dispensing nozzle attached to said container, said casing member including an open ended tubular casing portion longitudinally encompassing said inner container, a pair of external tubular casing portions telescoping over said first named casing portion, end closure members secured to said external casing portions, and a nozzle member secured to one of the end portions of the inner container and extending through an aperture in one of the end closure members, the other end portion of the inner container being in contact with the other end closure member, said inner fluid container being composed of soft yieldable rubber and self sustaining as to shape and form independent of said outer container.

6. A combined shipping and dispensing container comprising an inner corrosive resistant fluid holding container of soft yieldable rubber self sustaining as to form and shape, means for protecting said inner container and for preventing collapsing thereof upon handling, said means including a relatively rigid side wall in contact with said inner container, said means also including end closure members, and a dispensing member secured to an end portion of said inner container and projecting through an aperture in one of said end closure members.

7. A combined shipping and dispensing container comprising an inner corrosive resistant fluid holding container of soft yieldable rubber self sustaining as to form and shape, means for protecting said inner container and for preventing collapsing thereof upon handling, said means including a relatively rigid side wall and end closure members, said inner container being in contact with said side wall and at least one of said end closure members, and a dispensing member secured to an end portion of said inner container and projecting through an aperture in one of said end closure members.

8. A combined shipping and dispensing container comprising an inner corrosive resistant fluid holding container of soft yieldable rubber self sustaining as to form and shape, means for protecting said inner container and for preventing collapsing thereof upon handling, said means including a relatively rigid side wall and end closure members, a dispensing member secured to an end portion of said inner container and projecting through an aperture in one of said end closure members, said inner container substantially filling the space within said means and being in contact with said side wall and with the other of said end closure members.

ALEXANDER KATONA.